May 15, 1956　　　　J. O. BEATTIE　　　　2,745,138
APPARATUS FOR THE MANUFACTURE OF PLASTIC
LENSES FROM MONOMERIC MATERIALS
Filed May 26, 1953　　　　　　　　3 Sheets-Sheet 1
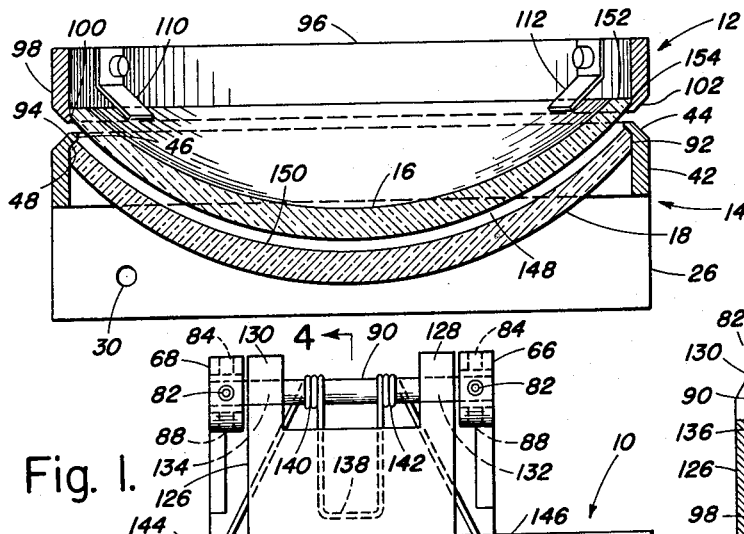
Fig. 3.
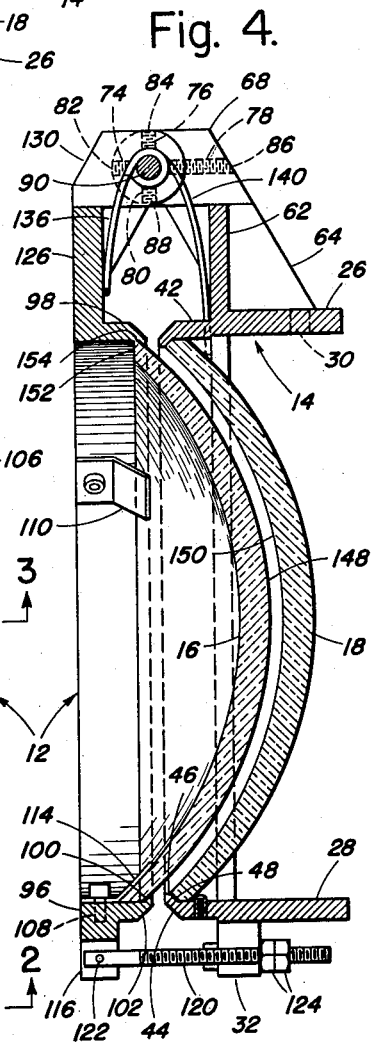
Fig. 4.
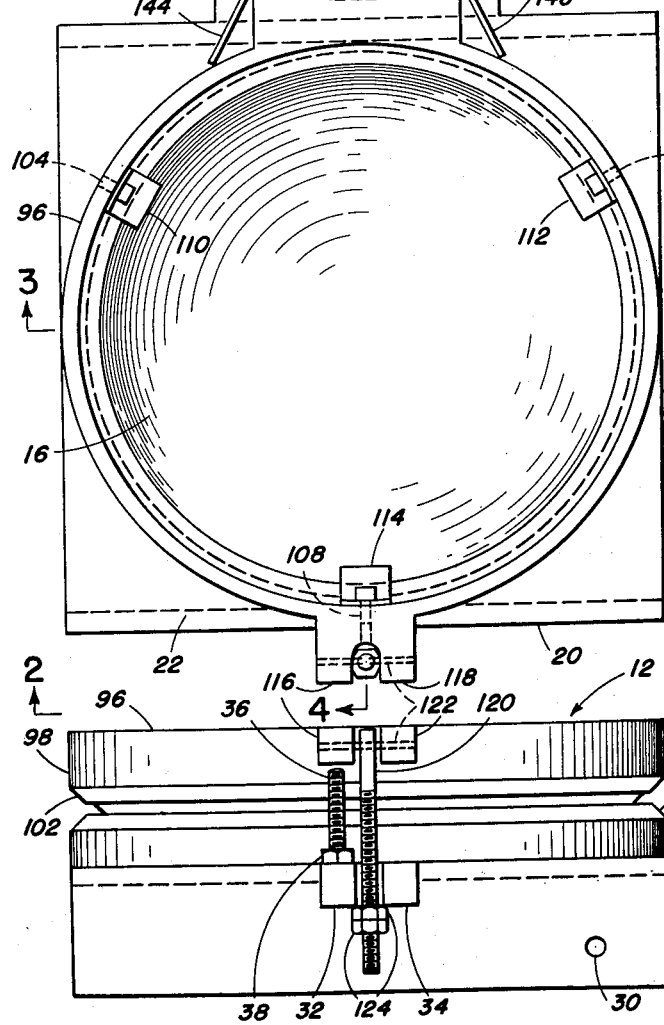
Fig. 1.
Fig. 2.
INVENTOR.
John O. Beattie
BY Arthur Middleton
ATTORNEY INVENTOR.
John O. Beattie
ATTORNEY

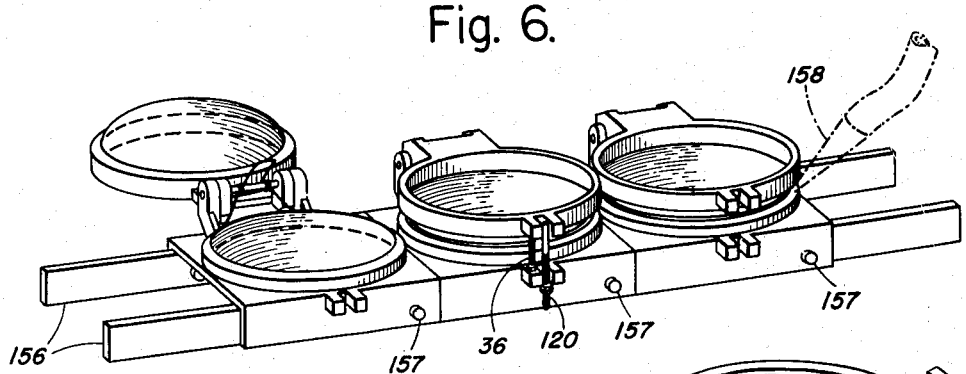
Fig. 6.
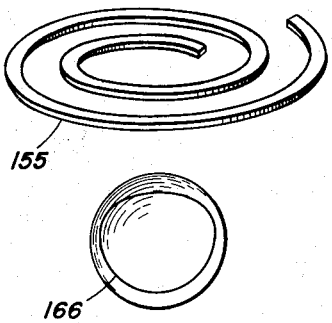
Fig. 11.
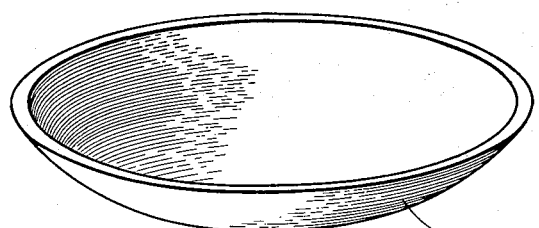
Fig. 7.
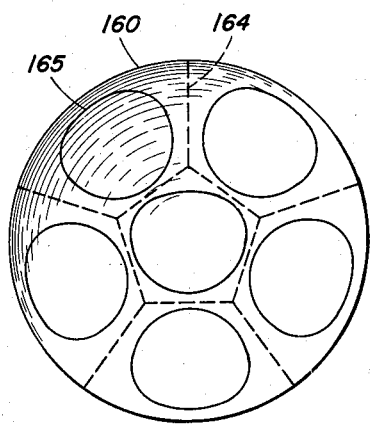
Fig. 8.
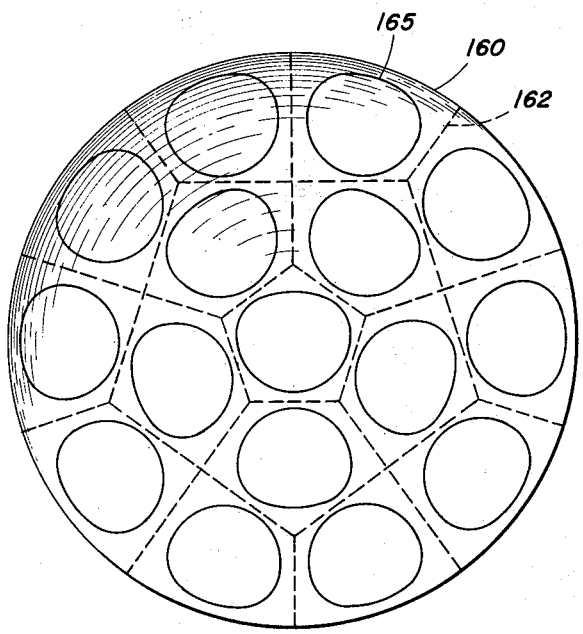
Fig. 9.
Fig. 10.
INVENTOR.
John O. Beattie
BY Arthur Middleton
ATTORNEY

United States Patent Office 2,745,138
Patented May 15, 1956

2,745,138

APPARATUS FOR THE MANUFACTURE OF PLASTIC LENSES FROM MONOMERIC MATERIALS

John O. Beattie, Stamford, Conn., assignor to Optical Plastics Corporation, Stamford, Conn., a corporation of New York Application May 26, 1953, Serial No. 357,521

7 Claims. (Cl. 18—26)

This invention relates to the manufacture of plastic lenses from monomeric materials, and comprises an improvement over the invention of my Patent No. 2,542,386, of February 20, 1951. By the practice of the patented invention, each plastic lens was cast and polymerized in an individual mold made up of two parallelly curved glass molding surfaces held together in a peripheral gasket by a spring. One object of this invention is to devise a mold from which the gasket can be omitted. Another object is to use a mold large enough so that a plurality of lenses can be cut from each molded curved blank. Still another object is to devise a mold in which the curved molding surfaces can readily be made parallel and so maintained with dependable precision. Still another object is to devise a hinged frame adapted to carry the abutting curved molding surfaces. Yet another object is to devise such a frame that while holding the open edged molds allows for significant parallelism of the molding surfaces during shrinkage of the monomer during its polymerization.

These, and possibly other objects that may appear hereinafter, can be realized by the practice of this invention when embodied in the apparatus. Such apparatus embodiment may be realized by molding apparatus comprising a two-part frame having hinged together a lower frame and an upper frame with means for holding a lower concavely curved holding surface in the lower frame and means for holding an upper concavely curved molding surface in the upper frame with a space between the molding surfaces open to the atmosphere at its periphery. Additionally, it is desirable to provide means for establishing and maintaining parallelism between the abutting faces of the molding surfaces, while yet allowing and equalizing for inevitable shrinkage of the monomer between the molding surfaces during its curing and polymerization.

In the following drawings, an embodiment of apparatus is shown:

Fig. 1 is a top plan view of the molding apparatus;

Fig. 2 is an end elevational view as seen along the plane of line 2—2 of Fig. 1;

Fig. 3 is a vertical transverse sectional view as taken substantially along the plane of line 3—3 of Fig. 1;

Fig. 4 is a vertical longitudinal sectional view as taken substantially along the plane of line 4—4 of Fig. 1;

Fig. 6 is a perspective view of several molding apparatus in a row on a multi-mold track or rack as for mass production;

Fig. 7 is a detail perspective view of the immediate product of the polymerized concave mass from which a plurality of individual lenses can be cut;

Fig. 8 is a top plan view of a single lens, the end product of the process;

Figs. 9 and 10 are top plan views of the concave masses as produced by different size mold apparatus, one having six lenses and the other having sixteen lenses; and Fig. 11 is a perspective view of a spacer gasket.

Figure 5:
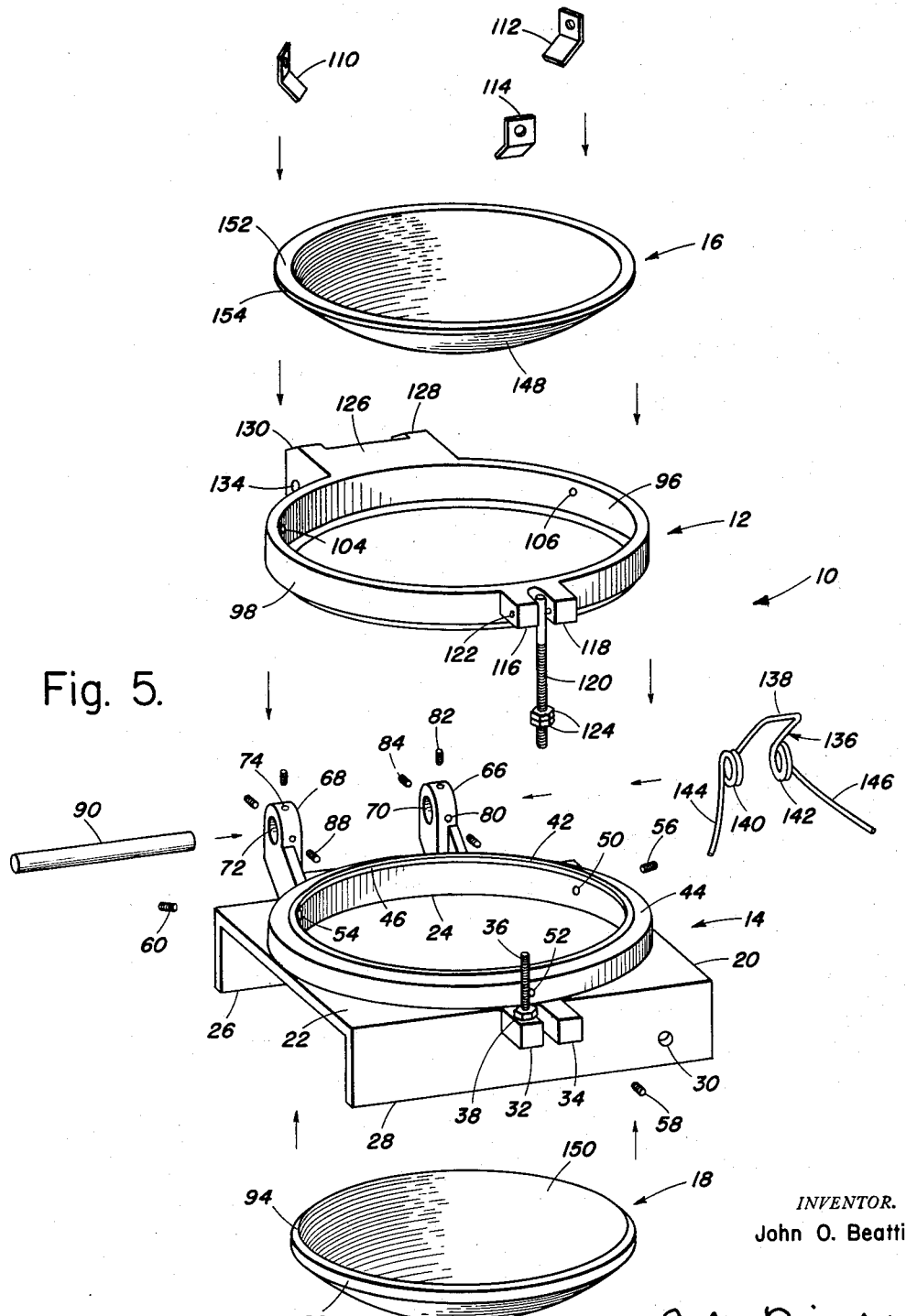
Fig. 5 is an exploded perspective view of the component elements of molding apparatus of the present invention.

Referring more particularly to the drawings, it will be seen that the molding apparatus 10 as shown in Figs. 1 through 5 includes a two-part frame that is comprised of upper and lower frames 12 and 14, respectively, and includes an upper convexly curved mold element 16 and a lower concavely curved mold element 18.

The lower frame 14 of the molding apparatus is comprised of a substantially channel-shaped rectangular base portion 20 including a rectangular horizontal wall portion 22 centrally apertured at 24 and having vertically downwardly extending flanges 26 and 28 at opposite side edges of the wall portion 22. At least one of the flanges, as 28, is provided with one or more openings, as at 30, for a purpose to be referred to hereinafter. At the central upper edge portion of the flange 28, there is provided a pair of perpendicularly outwardly extending lugs or projections 32 and 34 in parallel and spaced relation to each other. The lug 32 has vertically upwardly extending therefrom an adjustable abutment screw 36, which is threaded into a tapped bore of the lug 32 and has an adjustment nut 38 carried thereby. The projecting portion of the screw is adjustable by threading into the tapped bore and the nut 38 is employed for locking the screw in its adjusted position for a purpose to be described hereinafter.

The horizontal plate portion 22 has an annulus or annular flange 42 upstanding integrally therefrom and encircling the opening 24. The annulus has its upper outer surface beveled at 44 and has an inwardly extending rim at 46, the underside of which is beveled to provide a lower mold element abutting surface at 48. There are three equally spaced radially-extending threaded holes through the annulus 42 at 50, 52 and 54 in which are threadedly received the screws 56, 58 and 60, respectively, constituting three-point securing means.

As seen best in Figs. 1, 4 and 5, the flange 26 has an outwardly projecting ledge 62 rigidified relative to the flange 26 as by rib 64. A pair of upstanding spaced parallel lugs 66 and 68 are rigidly carried by the ledge 62 and rib 64. The lugs 66 and 68 have aligned pintle-receiving openings 70 and 72 therethrough. Each lug also has four equally spaced threaded holes 74, 76, 78 and 80 radially disposed relative to the openings 70 and 72 and in which holes are received screws 82, 84, 86 and 88 to constitute four-point centering means for the pintle 90.

The lower mold element 18 is essentially comprised of a concavely shaped thin glass element of preselected depth. The mold element 18, as seen in Figs. 3, 4 and 5, has a cylindrical peripheral surface at 92 and a beveled surface 94 extending inwardly from the upper edge of the surface 92 so as to provide surfaces conforming with the interior surface of the lower frame member above the screws 56, 58 and 60.

Having reference now to the upper frame member 12, it will be seen to be comprised of an annular or ring-like element 96 having a depending annular flange at 98, the inner and outer surfaces of which are beveled at 100 and 102, respectively, the inner surface 100 providing an upper mold element abutting surface. At three equally spaced locations about the inside surface of the ring-like element 96 are threaded openings 104, 106 and 108 in which headed screws are received for holding the clamping elements 110, 112 and 114 in three-point securing contact with the upper mold element 16. A pair of outwardly projecting lugs 116 and 118, similar to the lugs 32 and 34, are carried at the periphery of the ring-like element 96. A threaded latch element 120 is pivoted to the pin 122 carried by the spaced lugs 116 and 118 and a pair of lock nuts 124 are adjustably engaged on the latch element 120.

A flat rearwardly extending ledge 126, located oppositely from the lugs 116 and 118, terminates in a pair of lugs 128 and 130 having aligned pintle-receiving apertures 132 and 134 therein. The lugs 128 and 130 are so spaced as to be received between the lugs 66 and 68 of the lower frame 14.

Figure 5 best shows the details of the spring 136 which includes a substantially U-shaped portion at 138, coils at 140 and 142 and divergent leg portions at 144 and 146.

The upper mold element 16 is somewhat similar to the lower mold element but provides a convexly curved molding surface at 148 for predeterminate spacing from the concavely curved surface 150 of the lower element 18. The upper element 16 is formed of glass and has a preselected depth and size depending upon corresponding dimensions of the lower mold element. The element 16 has a flat upper annular surface at 152 and a cylindrically shaped periphery at 154.

*Assembly*

The lower mold element 18 is positioned within the lower frame member 14 by insertion from the underside thereof, and the screws 56, 58 and 60 are adjusted into contact with the glass mold element until it is properly seated against the surface at 48. Next, the upper mold element 16 is lowered into the upper frame member 12 so as to seat on the surface 100 and the clamping elements 110, 112 and 114 are adjusted to clampingly seat the element 16 in position. Thereafter, the upper and lower frame members 12 and 14 may be pivotally interconnected by inserting the pintle 90 through the aligned openings of the lugs and also through the coils 140 and 142 of the spring. The bight portion 138 is positioned for engagement against the underside of ledge 126 while the leg portions 144 and 146 engage the upper surface of the ledge 62, as shown in Fig. 4. Of course, the pivotal connection of the upper and lower frame members can be effected prior to the assembly of the mold elements to their respective frame member, if so desired.

A spacer, such as shown at 155 in Fig. 11, formed of any suitable flexible material to a desired spacer thickness is positioned in a spiraled fashion on the concavely curved surface of the lower mold element and the upper frame is lowered so that the upper mold element contacts the spacer 155. While the upper frame member is being held in that position, the latch element 120 is pivoted to between the lugs 32 and 34 and the nuts 124 are adjusted to contact the underside of the lugs 32 and 34 and then are locked together. Next the centering means in the form of the four screws 82, 84, 86 and 88 in each of the lugs 66 and 68 is adjusted to contact the pintle 90 to center the same while the glass mold elements are in their predeterminately spaced relation. Whereas the openings in the lugs 66 and 68 are oversize relative to the pintle, the openings in the lugs 128 and 130 are proper relative to the pintle. Finally, the abutment screw 36 is adjusted upwardly to a position predeterminately spaced below the adjacent lugs 116 so as to permit contracting movement between the mold elements due to shrinkage of the molded mass.

Thus, with the foregoing adjustments of the screws 82-88, the pivotal axis between the upper and lower frames is adjusted so as to properly parallelly relate the mold elements and provide an annular opening at the top of a concave pond defined by the pair of mold elements. Once set, the mold apparatus is ready for repeated use after removal of the spacer gasket.

As for materials employed in the molding apparatus of the present invention, I prefer to utilize aluminum castings for the frames, although other metals suitable for the purpose may be employed, and glass for the mold elements.

As to the monomer employed in casting lenses, I have found that to minimize, if not preventing sticking of the polymer to the curved molding surfaces, a lubricant must be employed.

The lubricant is Aerosol OT made by American Cyanamid Co. It is a solid and does not normally dissolve in the monomer. So it is necessary to mix some solvent to make the lubricant dissolve and stay dissolved irrespective of temperature. (In my previous work, the lubricant was a liquid soluble in the monomer to only a very slight degree. It precipitated out as solid particles if the monomer were refrigerated, which is necessary for storage. This made it impossible to store lubricated monomer when the earlier lubricant was used.) Therefore, I take ½ of 1% by weight of the monomer of methyl salicylate (oil of wintergreen) and dissolve the Aerosol in it to $\frac{1}{50}$ to ¼ of 1% of the weight of the monomer; heat to 70° C., dissolve the lubricant in the salicylate and stir the heated salicylate into the monomer. It will then stay in solution indefinitely. As a solvent for the lubricant, I can use methyl methacrylate.

The oil of wintergreen solvent for the lubricant also tends to cut down the ultra-violet ray transmission through the lens, and has better aging characteristics, namely, the plastic yellows less with age.

As in my previous patent the catalyzer employed in the monomer mix may be benzoyl peroxide or isopropyl percarbonate in an amount approximately 3% by weight of the monomer mix.

*Manufacture of lenses*

For production purposes, several molding apparatus, adjusted as above described, are mounted on the rails 156 and bolted thereto as at 157 as shown in Fig. 6. The operator closes the molds by pivoting the upper frame 12 from the position shown at the left of the figure to the position shown at the right of the figure with the latch screw 120 in place. Next the monomer, containing the lubricant and some catalyst, is injected by the nozzle 158 through the annular opening to the space between the mold elements 16 and 18. Inasmuch as the mold elements are transparent, the feed of monomer is terminated prior to overflow thereof through the annular opening. Alternatively, the feed can be of pre-measured quantities. The molds are then left to cure and in order to ensure hardening of the outer edges of the mass it is desirable to cure in an inert atmosphere such as of carbon dioxide. In curing, shrinkage does occur and in order that the parallelism of the mold elements be not materially affected, the structural arrangement is such that the pintle axis is remotely located relative to the periphery of the mold elements, rather than closely adjacent thereto, so that relative pivoting about the pintle does not materially change the parallelism, within the limit of the shrinkage. The adjustment of the abutment screw 36 is such as to prevent the glass molds from coming in contact with each other during handling, but not such as to limit contracting movement of the mold elements during the cure of the lens.

The mass in the mold when cured assumes the shape of the spherical shell 160, Fig. 7. The shell 160 may they be divided up as shown at 162 in Fig. 9 or at 164 in Fig. 10 and cut into individual lens pieces 165, the peripheries of which may be ground to shape, as to the shape 166 of Fig. 8. The size of the mold is selected to provide the number of lenses desired. For example, in practice, the molds for producing six base lenses are 5⅝" in diameter, with a radius of curvature of approximately 3½", producing a segment approximately 5" in diameter, with a thickness of from 1½ to 2 mm. (.060" to .080").

From the foregoing, it will be seen that the cleaning problem is greatly simplified as there is no flash adhered to the molds. Consequently, only a simple wiping with a scouring agent such as pumice is sufficient to prepare the surface for repeat use. An advantage is that detergents and hot water need not be used, thereby greatly extending the life of the molds.

In summation, the advantages of the present method over previous methods of casting plastic lenses in glass molds are as follows:

1. Multiple lenses are produced with each casting, rather than one lens from each casting.

2. A decrease in handling of glass molds is occasioned and this is accompanied by increased ease and speed of assembly of the mold.

3. An increase in ease of cleaning molds between cycles results from the absence of edge flash adhered to the mold.

4. Mold elements are not susceptible to damage by contact with each other as they are prevented from so contacting each other.

5. Loss of lenses because of monomer leakage obviated.

Because of the foregoing, the number of lenses produced per unit of labor is greatly increased. Furthermore, mold damage ceases to become a significant cost factor.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. Apparatus for making plastic lenses from monomeric materials, comprising a two-part frame having hinged together a lower frame and an upper frame; a lower mold having a concave molding face adapted to hold a pool of monomer to be polymerized; an upper molding face having a convex molding face adapted to press into said pool to form a concave lens-shaped pool; means for holding the lower mold in the lower frame; means for holding the upper mold in the upper frame; means for holding the molding faces and their peripheral edges uniformly and parallelly spaced apart including laterally extending lug means on each of the lower and upper frames, a pintle passing through the lug means, and securable means for centering the pintle in the lug means of one of the frames for thus parallelizing the molding faces.

2. Apparatus according to claim 1, with spring means associated with the pintle urging the molding faces apart, and means for adjustably and removably holding the molding faces against the urging of the spring means.

3. Apparatus according to claim 1 with spring means associated with the pintle urging the molding faces apart and means for adjustably and removably holding the molding faces against the urging of the spring means while constructing and arranging to allow relative limited movement of the molding faces toward and away from each other.

4. Apparatus according to claim 1, wherein the lug means are pintle entering apertured but with the apertures in the lug means of one of the frames being substantially greater in diameter than the pintle, and said centering means are associated with the larger apertures.

5. Apparatus according to claim 1, wherein abutment means is carried by one part of said two-part frame and abuts the other so as to permit hinging movement of the upper and lower frames upon shrinkage of the plastic between the molding surfaces within the limit of shrinkage of the plastic, and yet prevent contact of the mold surfaces.

6. Apparatus according to claim 5, wherein said abutment means includes an abutment screw adjustably carried by said one part of the frame.

7. Apparatus according to claim 6, wherein abutment means is carried by one part of said two-part frame and abuts the other so as to permit hinging movement of the upper and lower frames upon shrinkage of the plastic between the molding surfaces within the limit of shrinkage of the plastic, and yet prevent contact of the mold surfaces, and said mold surfaces are provided by transparent concavely and convexly curved elements.

References Cited in the file of this patent

UNITED STATES PATENTS

| | | |
|---|---|---|
| 448,133 | Cushing | Mar. 10, 1891 |
| 1,177,177 | Feix | Mar. 28, 1916 |
| 1,755,981 | De Mattia | Apr. 22, 1930 |
| 2,409,958 | Rogers et al. | Oct. 22, 1946 |
| 2,443,826 | Johnson | June 22, 1948 |
| 2,447,689 | Feinbloom | Aug. 2, 1949 |
| 2,542,386 | Beattie | Feb. 20, 1951 |